| United States Patent [19] | [11] | 4,333,643 |
|---|---|---|
| Saffire | [45] | Jun. 8, 1982 |

[54] JAVELIN

[76] Inventor: Victor Saffire, 450 Regimental Rd., King of Prussia, Pa. 19406

[21] Appl. No.: 122,126

[22] Filed: Feb. 19, 1980

[51] Int. Cl.³ ............................................. A63B 65/02
[52] U.S. Cl. .................................................. 272/106
[58] Field of Search ....................... 272/100, 104, 106; 273/68, 73 F, 80 R, 80 B, DIG. 7, DIG. 23, 416; 43/18 GF; 280/819

[56] References Cited

U.S. PATENT DOCUMENTS

| 298,111 | 5/1884 | Morse | 273/68 |
|---|---|---|---|
| 664,528 | 12/1900 | Brauers | 273/68 |
| 1,145,127 | 7/1915 | Dunnebacke et al. | 273/68 |
| 1,527,748 | 2/1925 | Rambow | 273/68 |
| 1,552,442 | 9/1925 | Lund | 272/106 |
| 1,569,395 | 1/1926 | Reach | 272/106 |
| 1,731,686 | 10/1929 | Rinneberg | 272/106 |
| 1,994,089 | 3/1935 | Pipal | 272/106 |
| 2,044,092 | 6/1936 | Manzeck | 272/106 |
| 2,122,023 | 6/1938 | Campbell et al. | 272/106 |
| 2,196,610 | 4/1940 | Schlademan et al. | 272/106 |
| 2,214,464 | 9/1940 | Jones | 272/106 |
| 3,232,613 | 2/1966 | Laube | 273/68 |
| 3,269,730 | 8/1966 | Miller et al. | 273/81 A X |
| 3,368,271 | 2/1968 | Scheffler | 273/68 X |
| 3,491,999 | 1/1970 | Lindler | 272/104 |
| 3,787,051 | 1/1974 | Johns | 273/DIG. 7 |
| 3,889,951 | 6/1975 | Schaefer et al. | 273/DIG. 23 |
| 3,902,732 | 9/1975 | Fosha et al. | 273/DIG 23 |
| 3,953,637 | 4/1976 | Phillips | 273/80 R X |
| 3,981,504 | 9/1976 | Gugel | 273/DIG. 23 |
| 4,015,360 | 4/1977 | Herter | 43/18 GF |
| 4,023,799 | 5/1977 | Van Auken | 273/DIG. 23 |
| 4,043,074 | 8/1977 | Airhart | 43/18 GF |
| 4,070,020 | 1/1978 | Dano | 273/DIG. 23 |
| 4,084,819 | 4/1978 | Van Auken | 273/DIG. 23 |

FOREIGN PATENT DOCUMENTS

| 475103 | 4/1929 | Fed. Rep. of Germany | 272/106 |
|---|---|---|---|
| 2520624 | 11/1976 | Fed. Rep. of Germany | 280/819 |
| 539288 | 3/1922 | France | 273/68 |
| 52388 | 11/1966 | Poland | 272/106 |
| 178264 | 9/1935 | Switzerland | 280/819 |
| 608240 | 9/1948 | United Kingdom | 272/106 |

OTHER PUBLICATIONS

"Archery"; Jun. 1974; pp. 10-13.

Primary Examiner—Richard J. Apley
Attorney, Agent, or Firm—Benasutti Associates, Ltd.

[57] ABSTRACT

A composite javelin having superior vibration damping characteristics is provided having a hollow or low density body of generally circular cross-section which tapers from small diameter front and rear tip ends to a large diameter more or less in the center, said tapered diameters and general tip and grip features being in conformance with the requirements of the International Olympic Committee. The javelin body can be constructed in either a one or two piece manner and constitutes a plurality of Kevlar ® or fiber glass prepreg bias wound plys forming an underlayer and a plurality of bias wound graphite/epoxy prepreg plys forming an overlayer. In the preferred two piece construction, the distribution of weight and composite center of gravity can be adjusted within the body to allow tuning the javelin to an individual athlete's throwing characteristics.

11 Claims, 4 Drawing Figures

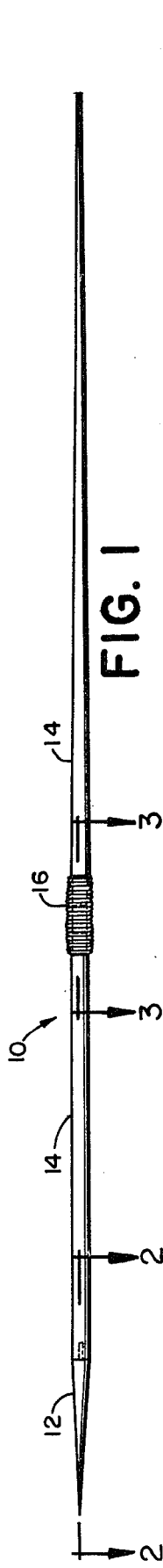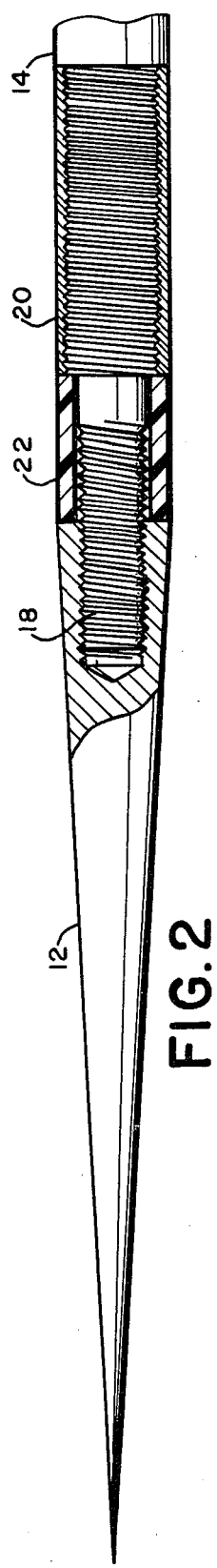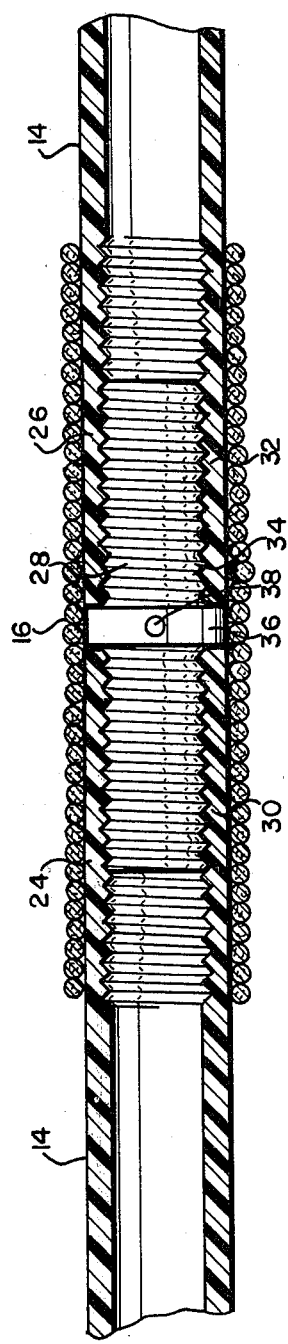

JAVELIN

BACKGROUND OF THE INVENTION

1. Field of the Invention

The present invention relates generally to improved athletic equipment, wherein the qualities of high strength, light weight and superior stiffness are required. This invention also provides a method for making such equipment. The outstanding characteristics and benefits achieved are described with reference to javelins as an example.

2. Description of the Prior Art

Throwing the javelin is one of a number of track and field events whose origins go back to the days of ancient Greece and perhaps even further. Originally derived from spears or similar military devices, the javelin has not evolved much over the years. Part of this problem has arisen because its current structure and shape are more or less controlled by the requirements of current International Olympic Committee (IOC) Rule 185-14 as follows:

"The javelin shall consist of three parts: a metal head, a shaft, and a cord grip. The shaft may be constructed of either wood or metal and it shall have fixed to it a metal head terminating a sharp point.

"The cord shall be about the centre of gravity without thongs, notches or identations of any kind on the shaft, and shall not exceed the circumference of the shaft by more than 25 millimeters (1 in.). The binding shall be of uniform thickness.

"The cross-section shall be regularly circular throughout and the maximum diameter thereof shall be under the grip. From the grip the javelin shall taper gradually to the tip of the metal head and the rear tip. The line from the end of the grip to the tip of the metal head may be straight or slightly curved, but the curve must be gradual and there must be no abrupt alteration in the diameter of the section throughout the length of the javelin.

"Note: Wilst the cross section should be circular, a maximum difference between the biggest and the smallest diameter of the oval of 5 percent is permitted. The mean value of these 2 diameters must correspond to the specification given for a circular javelin.

"It shall conform to the following specifications:

CHART

| Javelin | | Men | Women |
| --- | --- | --- | --- |
| Weight inclusive of cord grip | Min. | 800 g | 600 g |
| Overall length | Min. | 2.60 m | 2.20 m |
| | Max. | 2.70 m | 2.30 m |
| Length of metal head | Min. | 250 mm | 250 mm |
| | Max. | 330 mm | 330 mm |
| Distance from tip of metal heat to centre of gravity | Min. | 0.90 m | 0.80 m |
| | Max. | 1.10 m | 0.95 m |
| Diameter of shaft at thickest point | Min. | 25 mm | 20 mm |
| | Max. | 30 mm | 25 mm |
| Width of cord grip | Min. | 150 mm | 140 mm |
| | Max. | 160 mm | 150 mm |

"The javelin shall have no mobile parts or other apparatus which during the throw could change its centre of gravity or throwing characteristics.

"The tapering of the shaft from the maximum diameter to the tip of the metal head or to the rear tip shall be such that the diameter at the midpoint between the end of the cord grip and either tip shall not exceed 90 percent of the maximum diameter of the shaft and that at a point 150 millimeters from either tip 80 percent of the maximum diameter."

Over the last thirty years or so, as a result of the development of polymer, glass, boron and, most recently, carbon/graphite based composites there have been considerable improvements in the design and construction of many types of athletic equipment. These have included vaulting poles, golf clubs, tennis rackets (U.S. Pat. Nos. 4,070,020 to Dano, 4,023,799 to Van Auken, 3,981,504 to Gugel, 3,889,951 to Schaefer, et al. and 3,787,051 to Johns), fishing rods (U.S Pat. Nos. 4,043,074 to Airhart, 4,015,360 to Herter and 3,953,637 to Phillips) and skis (U.S. Pat. No. 3,902,732 to Fosha, et al.). However, one finds that there has been essentially no application of this technology to the design and development of improved javelins. Rather, the effort has primarily been directed to making minor improvements within the constraints of the IOC Rules. Thus, one finds most work on javelins being expended either to make an improved wooden item (U.S. Pat. Nos. 2,196,610 to Schlademan, et al., 1,731,686 to Rinneberg and 1,552,442 to Lund), to provide a stronger head/point construction (U.S. Pat. Nos. 2,122,023 to Campbell, et al., 2,044,092 to Manzeck, 1,994,089 to Pipal and 1,569,395 to Reach) which is less likely to break on impact, or to make a lighter weight metallic javelin. These efforts have succeeded to the point where modern javelins are indeed better than their predecessors of even 20 years ago. However, it is also known that the modern javelin, based as it is on a Grecian spear, is still far from optimum in regard to its flight properties. This, when combined with the relatively high densities of the currently allowed materials of construction, results in a considerable reduction in the maximum throwing distance a well trained athlete should expect to achieve with a properly designed javelin. The subject invention is intended to correct this situation and to provide a composite javelin having considerably improved physical and flight properties as compared to current wooden or metal models.

BRIEF SUMMARY OF THE INVENTION

When one sets out to develop an improved javelin, there are four basic parameters of concern. Physically it should be relatively light for maximum flight distance, strong to resist breaking on impact and stiff to resist flapping or flexing in flight. In addition, the center of gravity should, within limits, be adjustable so that the javelin can be, in effect, tuned to the particular physical characteristics of the athlete using it. With the single piece wooden or metal, steel pointed javelin now in general use, it has so far not been possible to optimize all these requirements within a single unit. In fact, to a considerable extent, these characteristics have proven to be mutually exclusive; that is, when one, such as minimum weight is achieved, others such as flex resistance tend to be adversely affected.

The subject invention overcomes many of these problems by applying composite material technology to the design and construction of javelins. Thus, for optimum physical properties, instead of solid wood or metal construction, a combination of light weight, high modulus polymeric and graphite fibers (resin bonded) is used to form a very strong, relatively thin laminated structure.

This can be done either over a light weight core such as urethane foam, or for maximum weight reduction, over a fusible or collapsible core which can be removed after resin cure to produce an even lighter hollow javelin.

The techniques of lamination also permit a solution to the problem of flapping or flexing in flight. This is done with a cross-ply, oblique tape wrapping technique in which the winding axis of any individual layer is always at some angle to that of the layers on either side. Depending on the fiber modulus, and the bonding resin and winding angles used, it is possible to design very rigid structures having extremely high coefficients of stiffness that will not bend to any significant degree when subjected to aerodynamic loads of the types encountered in javelin flight. This is a matter of some importance. It is known that in a series of repetitive throws by a single athlete there will be generated a landing pattern in the form of a circle having perhaps a ten meter diameter. This is because the aerodynamic shape of the javelin changes during flight because of the flexure. As a result, the javelin does not fly true down the ballistic trajectory path originally established at the time of launch. To the extent that the flight path is "untrue" or off line from the trajectory path, it represents a net loss in the total effective throwing distance which is measured. With the stiffer javelin described herein, less energy is lost in vibration and oscillation. In turn the landing pattern circle is considerably smaller and therefore the effective throwing distance is increased.

The solution to the problem of javelin "tuning" has resulted in a major departure from current practice. At present, an IOC javelin is a one piece device having a center of gravity more or less fixed at its time of manufacture. While this may vary from unit to unit, it cannot be later adjusted, so that the athlete often has to try out a series of units to find the one best suited to his throwing style. The subject invention on the other hand, is designed as a two piece unit with an integral screw connection slightly forward of the center. This allows the forward end to be removed and replaced, if necessary, by another. As currently planned, the tail ends would all be essentially identical. However, the forward ends would not, and would be variable in terms of length, weight distribution and composite center of gravity so that the finished javelin can be exactly tuned, within the IOC limits, to each individual thrower's characteristics.

This approach to javelin construction offers other advantages as well. Thus if the forward end is damaged on impact, it can quickly be removed and replaced by another, essentially identical unit. As a result, the athlete can continue competition with a javelin having the same flying characteristics at substantially lower costs than is now possible with non repairable units. Lastly, two piece construction greatly enhances ease, and lowers costs, of shipping as compared to standard javelins.

Thus, the principle object of the subject invention is to produce a composite javelin having improved flight properties.

It is another object of the subject invention to produce a composite javelin which is stiffer and stronger than current IOC javelins.

It is a another object of the subject invention to produce a javelin wherein the center of gravity is adjustable, within IOC limits, so that the throwing characteristics can be adapted to the needs of an individual athlete.

Still another object of the subject invention is to produce a javelin having improved repair capabilities at a lower cost than is possible with present IOC javelins.

These and other objects of my invention will become apparent from the following description with reference to the accompanying drawings.

BRIEF DESCRIPTION OF THE DRAWINGS

FIG. 1 is an overall view of a javelin according to the present invention;

FIG. 2 is an enlarged cross-sectional view of the forward end of the javelin illustrated in FIG. 1;

FIG. 3 is an enlarged view of the mating area between the forward and aft sections of the javelin illustrated in FIG. 1;

DETAILED DESCRIPTION OF THE INVENTION

Figure 4:
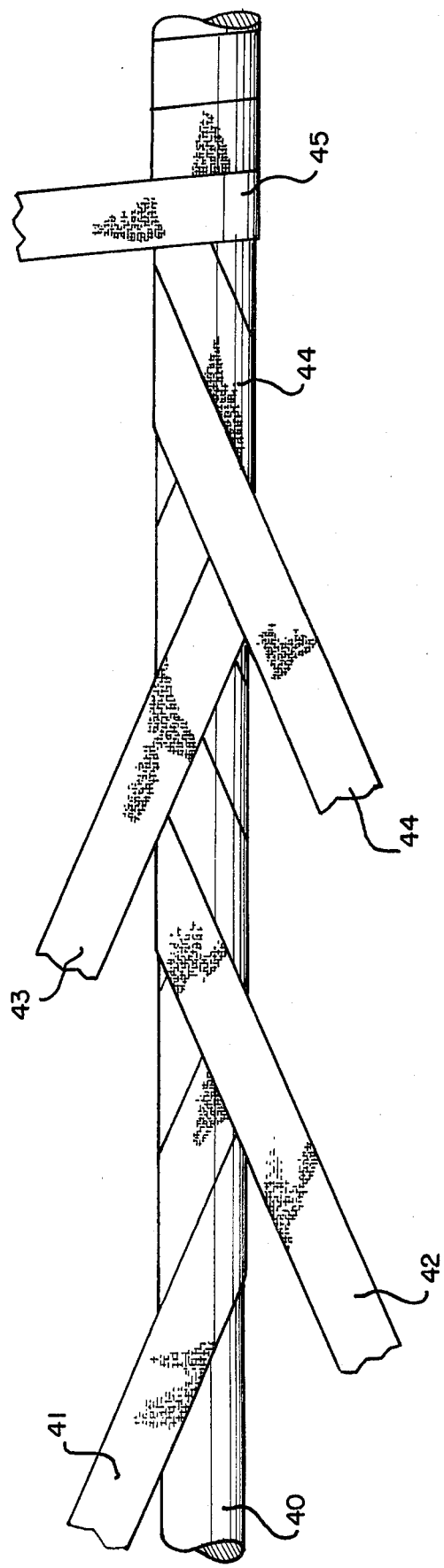
FIG. 4 is a partial, top plan view illustrating the several wrapped layers which comprise the javelin.

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1 we see a javelin 10 according to the present invention. As shown, the external envelope and general structure are strictly in conformance with the IOC Rules. Thus, there is a metal head, or tip, 12, a shaft or body 14, and a cord grip 16. However, in examining the preferred embodiment in detail, it is seen that there are also substantial differences from the conventional one piece unit now used in competition. It is these differences which constitute the present invention.

Referring now in detail to FIGS. 1 and 2 and starting from the forward end, the first component shown is tip 12. This is of solid construction in the shape of a narrow right cone, approximately twelve inches long. The cone half angle at the tip is about 2°, which allows the sides to blend easily with the normal forward slope of body 14. Although it is used primarily as a spear point for landing purposes, tip 12 is also one of a group of interactive factors which, in the preferred embodiment, allows fine tuning for maximum flight characteristics. Normally, for optimum flight, it has been found that a javelin should have a slight positive angle of attack relative to its ballistic trajectory for most of its flight. This provides a slight amount of lift so that the javelin tends to sail out to its maximum flight distance. However, near the end of the flight the angle of attack should shift to a slightly negative aspect so that the javelin will cleanly drive itself into the ground on impact without excessive bending forces on the tip/body junction point.

The ability to achieve optimum flight angles within an IOC envelope configuration is a function of both the location of the center of gravity and the distribution of the weight within the final structure. In the preferred embodiment described herein, it is the ability to vary these factors within the structure which allows tuning the javelin to match the athlete's throwing characteristics. The tip enters into this capability in several ways. First of all, it provides weight for the front end to assure a proper negative angle for landing. Depending on the other factors involved, this weight can either be "large" or "small", and such a variation can be easily achieved over a relative weight ratio of approximately 5 depending on whether magnesium (density = 1.74 g/cc), aluminum (d = 2.7), steel (d = 7.9) or copper (d = 8.96) is used as the basic tip "metal". Each of these is readily available, easily machinable and sufficiently strong and rigid to take the impact loads without bending or breaking. To improve on the flight characteristics, a lead ballast (not shown) can also be incorporated into the tip design. Where a hollow javelin is made, such a ballast may be needed to bring the total body weight to the IOC 800 gram minimum.

The second tip factor for fine tuning purposes is in its method of attachment to body 14. As shown in FIG. 2, at the base of tip 12 is threaded mounting stud 18. This screws into a mating threaded insert 20 in the forward end of shaft 14. Cooperating with these is a hollow cylindrical disposable spacer 22 adapted to fit over stud 18 and block off some of its threads. This has an outer diametric configuration adapted so that it blends smoothly with both the base of tip 12 and the forward end of shaft 14 and thus promotes an orderly transition in the external outline between these two pieces. Both the stud and spacer are variable in length so that the exact position of tip 12 relative to shaft 14 can be adjusted over a range of perhaps half an inch, which can affect significantly the flight characteristics actually achieved.

A second major component of javelin 10 is body shaft 14. Although this can be formed in one piece to conform with the IOC requirements, the preferred embodiment of the subject invention is composed of a hollow front section 24 and hollow rear section 26 joined together by a coupling 28 as shown in FIG. 3. As will be described hereinbelow the two body elements are bias wound tape composite structures both having an exterior envelope in full conformance with IOC requirements. As wound, the internal taper more or less follows the external taper.

Coupling 28 can be preassembled from a variety of elements such as a slide joint, a keylock joint, or in the preferred embodiment, a threaded joint. This junction occurs about one-third ($\frac{1}{3}$) of the total distance from the forward to the aft end of the body 14. As shown, front section 24 has threaded insert 20 in its forward end. This is matched by a second threaded insert 30 at its rear end which is adapted to receive a part of coupling 28. The remainder of coupling 28 is screwed into a similar, third threaded insert 32 on the front end of rear section 26, so when, as hereinbelow described, the two elements are joined, the body of a complete javelin 10 is formed. Coupling 28 itself is composed of a single threaded headless bolt 34 approximately three inches long which actually joins the two elements, and a threaded ring 36 which fits onto bolt 34 which and is adapted to run back and forth on the bolt 34. This has an outer diameter which is equal to that of the front and rear sections at the junction point so that, here too, there is an orderly, smooth transition between the connected front and rear sections.

As shown, the combined depth of threaded inserts 30 and 32 is longer than bolt 34 so that there is considerable flexibility as to where the bolt 34 is placed, and therefore, how the length and weight of bolt 34 is actually apportioned between the front and rear body sections. It is the position of ring 36 on bolt 34 which determines just how this weight is distributed. By so doing, it is possible to vary the resultant center of gravity over a range of perhaps two inches. To keep this constant and to meet the IOC requirement of no movable parts during flight, the ring itself is locked in place by set screw 38. Although the nominal fit of the front and rear sections on bolt 34 is sufficiently tight so that there is very little, if any, probability of them coming loose as a result of handling, further protection against this event can be achieved either by bonding the entire assembly in place or by using similar set screws to lock them onto the bolt.

The point of junction is covered by grip 16 which forms the surface which the athlete actually handles when he grips the javelin for his throw. In accordance with IOC requirements, this is made of 3–4 mm diameter cord in a tight spiral winding and is about 150 mm long. In the preferred embodiment this grip is centered more or less on the junction line.

In the development of an improved javelin as described hereinabove, full advantage can be taken of the outstanding strength and modulus properties of advanced composite base materials, such as graphite, boron, Kevlar ®, or fiberglas ® used either as single filaments or in prepregged tapes of various widths, bonded with a resin such as a B staged epoxy. For example, of these materials, Kevlar ®, grade (PRD)-49-III can be provided by the manufacturer, E. I. du Pont de Nemours & Co., with elastic modulus values up to $19 \times 10^6$ PSI. Boron fibers are deposited on a 0.5 mil. diameter tungsten wire substrate to form a continuous single filament having a 4.0, 5.6 or 8.0 mils. diameter and can reach an ultimate tensile strength of $400-500 \times 10^3$ PSI and tensile elastic modulii in the range of $50-60 \times 10^6$ PSI.

Of the potential materials, graphite, as developed for a variety of aerospace uses is the most versatile. Starting from either rayon or polyacrylonitrile (PAN) precursors, with or without pitch impregnation for densification, and with fiber contents varying from 1000–10,000 per tow, yarns or tapes up to 60 inches wide can easily be produced. When combined with an epoxy or similar resin a wide range of mechanical properties can be achieved.

With proper design and application, these advanced composites either singularly or in combination make it possible to build a dimensionally compliant javelin with excellent flex resistance and vibration damping and significantly improved aerodynamic flight characteristics. In the preferred embodiment of this invention, wherein stiffness is the key design characteristic desired, it has been found that the combination of a Kevlar ®/epoxy prepreg fabric construction underlayer combined with a filament cord or tape of graphite/epoxy prepreg tape overlayer provides a javelin which features high stress-rupture characteristics, good fatigue resistance and excellent vibration damping. For the overlayer a low cost, high strength (LHS) fiber prepreg is preferred This of course requires that it be in a B staged condition when wrapped for a controlled cure cycle. This has an ultimate tensile strength of $300-500 \times 10^3$ PSI and a tensile modulus of $30-40 \times 10^6$ PSI.

The preferred method of fabrication involves winding these composites around a mandrel which is radially symetrical so that its central axis is the same as that of the finished part. In the preferred embodiment, the mandrel is removed after the final cure of final wound body sections. Depending on the manufacturing process used, a variety of different mandrel materials and structures are available. For example, these can be made from cast soluble salt molded to the exact internal contour required, an inflatable rubber balloon, segmented solid teflon or low temperature meltable cast alloys. However, for the preferred two piece javelin a somewhat simple approach can be taken and a solid steel mandrel, chrome plated for better part removal is preferred. In all cases where the mandrel is to be removed, a suitable mold release must be applied to the mandrel surface. However it is formed, the mandrel should have the same external envelope as that of the finished product, but, of course, reduced in diameter. This will allow a uniform wall thickness, which in the preferred embodiment will be on the order of 5 to 6 mm, to be laid up.

For the preferred two piece javelin, fabrication is started by cross ply bias wrapping an underlayer 41 of a uniaxial Kevlar ®/epoxy prepreg tape onto the mandrel 40 which is set into a suitable rotary winding machine such as a long bed lathe. While any suitable resin can be used to impregnate the tape the diglycidyl ethers of bisphenol A type epoxies are preferred. One such epoxy which has been used satisfactorily is HMS/CE 339, sold by the Ferro Corporation, and has a cure temperature on the order of 250° F. Another satisfactory epoxy is HMS 3501/6. This is available from the Hercules Corporation and has a cure temperature of approximately 350° F.

The bias angle can be between 0° and 30° relative to the central axis of the mandrel 40 depending on the design characteristic desired. In the preferred embodiment this angle is about 10°. After the first layer 41 of prepreg tape is applied, the mandrel is then rotated 180° and a second cross ply layer 42 of Kevlar ® is applied at the same angle. In doing this, sufficient tape tension must be maintained at all times to eliminate any wrinkling or folding which might otherwise tend to occur during winding. Additional plys, (usually between two and four) alternating as described above to form the cross ply structure are applied until a total thickness in the range of about 0.4–0.6 mm, is reached, after which the overlayer is applied. This is made of an LHS graphite/epoxy unidirectional prepreg tape which is approximately 36" wide. This is applied with the same cross ply bias winding technique used to apply the underlayer, that is, in alternately wrapped layers 43, 44 at a ±10° angle to the central axis until a total wall thickness of approximately 4 to 5 mm has been reached, at which point the overall IOC prescribed configuration is reached. This normally requires between six and ten plys depending on the denier of the fiber and gauge of the fabric used to make the tapes.

Once the overlayer has been wrapped, the entire assembly is then overwrapped and sealed with a ½" wide heat shrinkable film, 45 such as polyvinyl acetate, which is applied in a spiral manner at an angle more or less 85° to the central axis to prevent excessive resin bleedout during cure. The entire assembly is then placed in an oven to cure for one to two hours at approximately 275° to 350° F. and is then allowed to cool, after which the film and mandrel can be removed.

After the front and back portions of the javelin, each having a distinct external shape to meet the IOC specification requirements, have been fabricated, the mandrels are removed, the parts examined for flaws and weighed. In practice both parts are fabricated to be slightly longer than required so that the center joint 28 can be more easily tailored to be at or near the design center of gravity for the entire assembly.

The preassembled center joint 28, which is usually preset for a specific center of gravity, is bonded to the ID surfaces of the two portions 24 and 26 of javelin 10. After the two parts are assembled, the unit is spray painted with a clear urethane varnish and the cord grip 16 is spiral wound over joint 28 to complete the final assembly. With this, the interior of the javelin is fully sealed both from the external environment and the possibility of potential tampering, yet adapted to allow the javelin to be readily taken apart for transportation and/or repair.

At the forward end, metal tip 12 is set in place. This should be done by bonding which should be done in a fixture so that the javelin body and tip are properly aligned. Metal tip 12 is inserted as described hereinabove and bonded in place with a standard epoxy adhesive. By adding or shaving weight from a lead ballast which (if used) can be contained either in the metal tip 12 or joint 28, or by changing the length of insert 22 prior to bonding, a tailored javelin having superior physical and flight characteristics and a designed but adjustable center of gravity can be prepared.

If a one piece javelin is desired, the wrap angles and fabrication techniques described above would be exactly the same except that the entire process would be performed on a retained core which would act as the mandrel. For this, depending on the weight required, this core could be formed either from the materials described hereinabove, to rigid polyurethane foam, or injection molded Lexan ® or equivalent resin. Of course in so doing, the lack of center joint 28 severely restricts the degree of center of gravity adjustment possible.

It will be understood that various changes in the details, materials and arrangement of parts which have been herein described and illustrated in order to explain the nature of this invention may be made by those skilled in the art within the principle and scope of the invention as expressed in the following claims.

I claim:

1. A javelin having a hollow body of generally circular cross section which tapers from a small diameter rear-end through a larger diameter middle section to a reduced diameter at its front end, the interior of said body tapering more or less in the same manner as the exterior so as to keep the wall thickness of said body more or less constant from the front end to the rear end;
    wherein said javelin body comprises separate front and rear sections, each of which comprises a hollowed tapered portion starting at a small diameter tip and ending with a large diameter end, said front and rear sections being matably engaged at said large diameter ends by adjustable coupling means to form said body;
    wherein said coupling means comprises joint means adapted to threadably engage and connect the large diameter ends of said front and rear sections to form said body, said joint means being adapted so that different portions of the length of said joint means can be inserted into said front and rear sections, thus altering the relative distribution of joint weight between them, said coupling further comprising ring means adapted to threadably engage and move on said joint means so that its position on said joint means establishes said relative distribution of joint weight between said front and rear sections of said body, said coupling further comprising locking means adapted to fix said front and rear sections on to said joint means so that they cannot be moved once their final position is established; and wherein said javelin body further comprises a first plurality of cross-ply bias wound fiber plies wound on a tapered, cylindrical mandrel having a central axis radially symetrical within said body to form an underlayer and a second plurality of cross-ply bias wound fiber plies which are wound over said underlayer to form an overlayer, said cross-plies being bias wound at an angle between 0° and 30° relative to said central axis of said mandrel;

said javelin further comprising a tapered metal tip mounted at its front end and a cord grip wrapped around a portion of the exterior of said body.

2. A javelin as recited in claim 1, wherein said cross-ply bias wound underlayer and overlayer are both applied in alternating ply angles of ±10° to the central axis of said mandrel.

3. A javelin as recited in claim 2 wherein said underlayer is resin bonded tape having a modulus of elasticity more or less of $19 \times 10^6$ pounds per square inch, said underlayer being wound to a thickness of 0.4 to 0.6 mm.

4. A javelin as recited in claim 3 wherein said overlayer is resin bonded graphite tape having an elastic modulus of 30 to $40 \times 10^6$ pounds per square inch, wherein said overlayer is applied in a sufficient number of plies to reach a wall thickness having an external configuration as defined by the Rules of the International Olympic Committee, and wherein said wall thickness is in the range of 4 to 5 mm.

5. A javelin as recited in claim 4 wherein said metal tip is a narrow right cone approximately twelve inches long and further having a cone half angle of about 2° so that, when mounted, its external configuration will blend smoothly with the front end of said body, said tip having a stud on its rear end adapted to threadably engage a mating insert in said front end, said tip further comprising a hollow spacer which partially blocks off some of the threads on said stud so that the degree of engagement between said tip and said front end is controlled, said spacer having an external configuration such that it permits the smooth blending of the exterior surface from the rear end of the tip to the front end of the body.

6. The javelin of claim 5 wherein said tip is made from a metal selected from the group consisting of magnesium, aluminum, steel and copper.

7. A javelin as recited in claim 4 wherein said first and second pluralities of plies are bonded by an epoxy resin which is a diglycidyl ether of bisphenol A having a cure temperature in the range of 275° to 375° F.

8. A javelin comprising:
   a. a body having separate front and rear sections, each of which includes a tapered portion extending from a small diameter tip to a large diameter end; and
   b. adjustable means for matably engaging said large diameter ends to form said body, said adjustable coupling means comprising:
      i. threaded insert means associated with each of said large diameter ends;
      ii. coupling means for threadably engaging each of said threaded insert means; and
      iii. ring means threadably engaging and movable along said coupling means to vary engagement between said coupling means and said threaded insert means;
   so that movement of said ring means alters the relative distribution of weight between said front and rear sections of said body.

9. The javelin of claim 8 wherein said ring means further comprises means for locking said ring means in position with respect to said coupling means.

10. The javelin of claim 8 wherein said javelin includes a tip portion operatively associated with the small diameter tip of said front section and wherein said tip portion comprises:
    a. a narrow, right circular cone portion having a stud associated with its rearmost end and adapted to engage a threaded insert associated with the small diameter tip of said front section; and
    b. spacer means positioned around said stud and between said cone portion and said small diameter tip of said front section.

11. The javelin of claim 10 wherein the length of said spacer means is variable.

* * * * *